United States Patent
Bai

(10) Patent No.: US 12,473,984 B2
(45) Date of Patent: Nov. 18, 2025

(54) OVERPRESSURE SHUTDOWN DEVICE

(71) Applicant: Yi-Jhih Bai, Taichung (TW)

(72) Inventor: Yi-Jhih Bai, Taichung (TW)

( * ) Notice: Subject to any disclaimer, the term of this patent is extended or adjusted under 35 U.S.C. 154(b) by 1 day.

(21) Appl. No.: 18/613,124

(22) Filed: Mar. 22, 2024

(65) Prior Publication Data

US 2025/0297684 A1    Sep. 25, 2025

(51) Int. Cl.
*F16K 7/17* (2006.01)

(52) U.S. Cl.
CPC ...................................... *F16K 7/17* (2013.01)

(58) Field of Classification Search
CPC . F16K 7/17; F16K 17/20; F16K 17/34; F16K 31/1266
See application file for complete search history.

(56) References Cited

U.S. PATENT DOCUMENTS

| | | | | |
|---|---|---|---|---|
| 3,892,258 | A * | 7/1975 | Hendrick | F16K 31/365 137/461 |
| 10,883,617 | B2 * | 1/2021 | Igarashi | F16K 31/1266 |
| 11,846,359 | B2 * | 12/2023 | Huang | F16K 17/34 |

FOREIGN PATENT DOCUMENTS

| | | | | |
|---|---|---|---|---|
| IT | 1056154 B | * | 1/1982 | ......... F16K 31/1266 |
| KR | 20090120286 A | * | 11/2009 | |

OTHER PUBLICATIONS

Machine English translation of IT_1056154_B (Year: 2025).*
Machine English translation of KR_20090120286_A (Year: 2025).*

* cited by examiner

*Primary Examiner* — Hailey K. Do

(57) ABSTRACT

An overpressure shutdown device includes a main body having an inlet chamber and an outlet chamber, with a communication hole communicating therebetween. The main body has a combined hole communicating with the outlet chamber. A circular groove is recessed around the combined hole. A cover and an elastic diaphragm are installed in the circular groove. The elastic diaphragm is located between the circular groove and the cover. The cover includes an opening. A return button is located inside the cover and corresponds to the opening. A flow-stopping piece is located at the position where the inlet chamber is located corresponding to the communication hole. A rod extends through the elastic diaphragm, and is connected to the return button and the flow-stopping piece. When the air pressure becomes unstable, the elastic diaphragm rises, driving the rod upwards, thereby blocking the communication hole with the flow-stopping piece.

6 Claims, 7 Drawing Sheets

OVERPRESSURE SHUTDOWN DEVICE

FIELD OF THE INVENTION

The present invention relates to an overpressure shutdown device, and more particularly, to a device installed in gas storage equipment that is capable of preventing the continued flow of fluid when the pressure of the fluid exceeds a predetermined value due to unexpected occurrences.

BACKGROUND OF THE INVENTION

Gas refers to gases that can be used as fuel (such as natural gas, gas, coal gas), which produce a large amount of heat energy when burned. Therefore, it is widely used in daily life, such as water heaters, gas stoves, and other equipment commonly used in daily life that use burning gas as kinetic energy.

Generally, when gas storage devices are used, relevant protective devices such as overflow valves are installed at the gas outlet of the storage device. For example, the overflow valve is a common type of valve that is often used in fluid transportation pipelines. According to specifications, the overflow valve has a flow setting value. When the fluid flowing into the overflow valve exceeds this flow setting value, the overflow valve will close to stop the fluid from continuing to flow downstream. For example, if there is an abnormality in the gas supply source, causing the flow of fluid into the overflow valve to increase suddenly, the overflow valve will close to prevent further leakage of fluid. Furthermore, if abnormalities in the upstream source cause a sudden increase in output flow triggering the closure of the overflow valve. Otherwise, if the pressure inside the pipeline increases by more than 10% and the pipeline or equipment is old, there is a possibility of sudden gas explosion.

However, commercially available protective devices similar to overflow valves have problems such as overly complex structures (combining multiple functions or different axial linkage mechanisms) and high production costs. Due to their complex structure, they have a relatively large volume. These aforementioned drawbacks are not acceptable to consumers or producers. Therefore, it is necessary to improve the protective devices for gas storage devices to address the aforementioned shortcomings.

The present invention intends to provide an overpressure shutdown device to eliminate the shortcomings mentioned above.

SUMMARY OF THE INVENTION

The present invention relates to an overpressure shutdown device and comprises a main body having an inlet chamber and an outlet chamber. A communication hole is defined between the inlet chamber and the outlet chamber. The main body has a combined hole which communicates with the outlet chamber. A circular groove is recessed around the combined hole on the outer side of the main body. A stop assembly includes an elastic diaphragm, a rod, a flow-stopping piece, a return button, and an outer cover. The cover and the elastic diaphragm are located in the circular groove. The elastic diaphragm is partially located between the circular groove and the cover. The cover includes a cover opening. The return button is at least partially located inside the cover and corresponds to the cover opening. The flow-stopping piece is located at a position where the inlet chamber is located corresponding to the communication hole. The rod extends through the elastic diaphragm. The rod is connected between the return button and the flow-stopping piece.

The primary object of the present invention is to stop fluid overpressure and which is achieved through the use of an elastic diaphragm in conjunction with a rod and a flow-stopping piece. Generally, under normal usage, the flow velocity of the fluid passing through the main body should be stable, resulting in stable internal pressure. However, if there is a sudden change in flow velocity due to unexpected circumstances, causing instability and an increase in pressure inside the main body, the increased pressure will cause the elastic diaphragm to expand and rise. As the elastic diaphragm rises, it drives the rod upwards, ultimately blocking the communication hole with the flow-stopping piece, preventing the fluid from flowing into the outlet chamber. When the anomaly is resolved, simply pressing down the return button will cause the elastic diaphragm to flip down and return to its initial state, thereby releasing the fluid obstruction. From the foregoing, it can be understood that the structure of the present invention achieves fluid obstruction and return functions with a single axial movement, without the need for multiple axial mechanisms as commonly seen in existing products to achieve various functions. Therefore, the complexity of the structure of the present invention is indeed lower compared to conventional products, which can lead to cost savings and reduced volume. The present invention is novel and progressive in this regard to provide a securing device The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
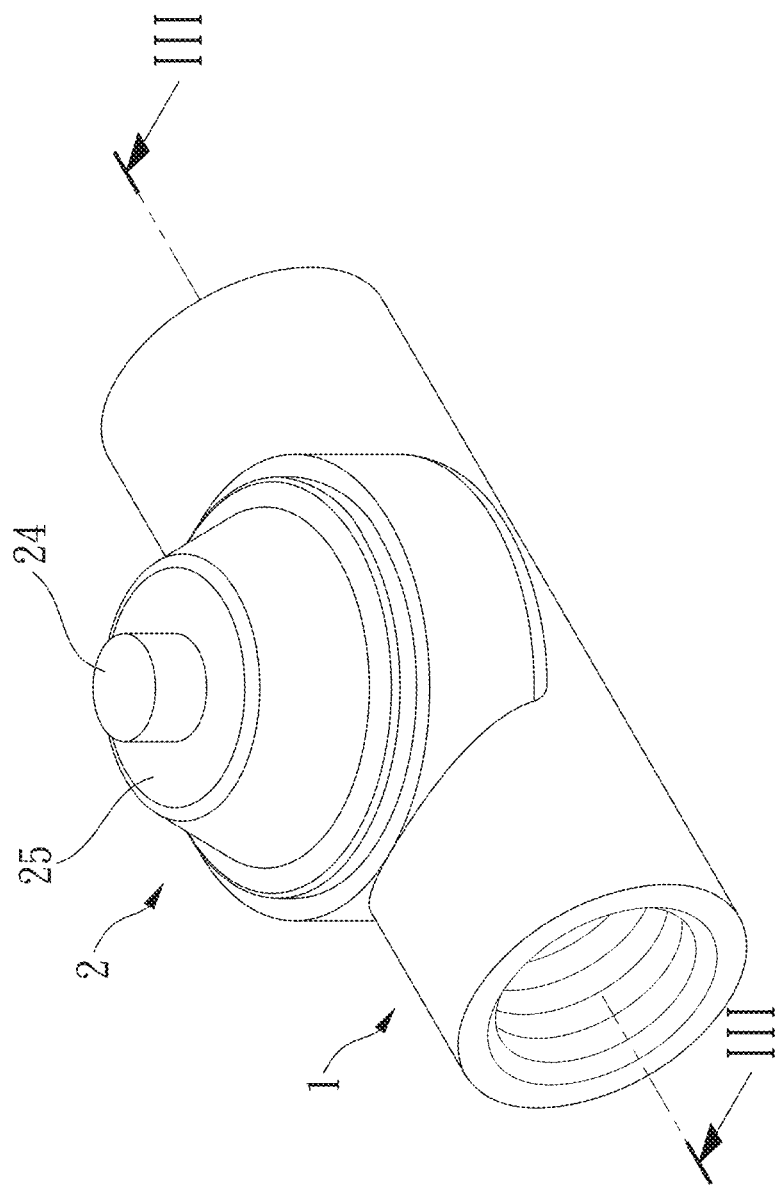
FIG. 1 is a perspective view of the present invention.
Figure 2:
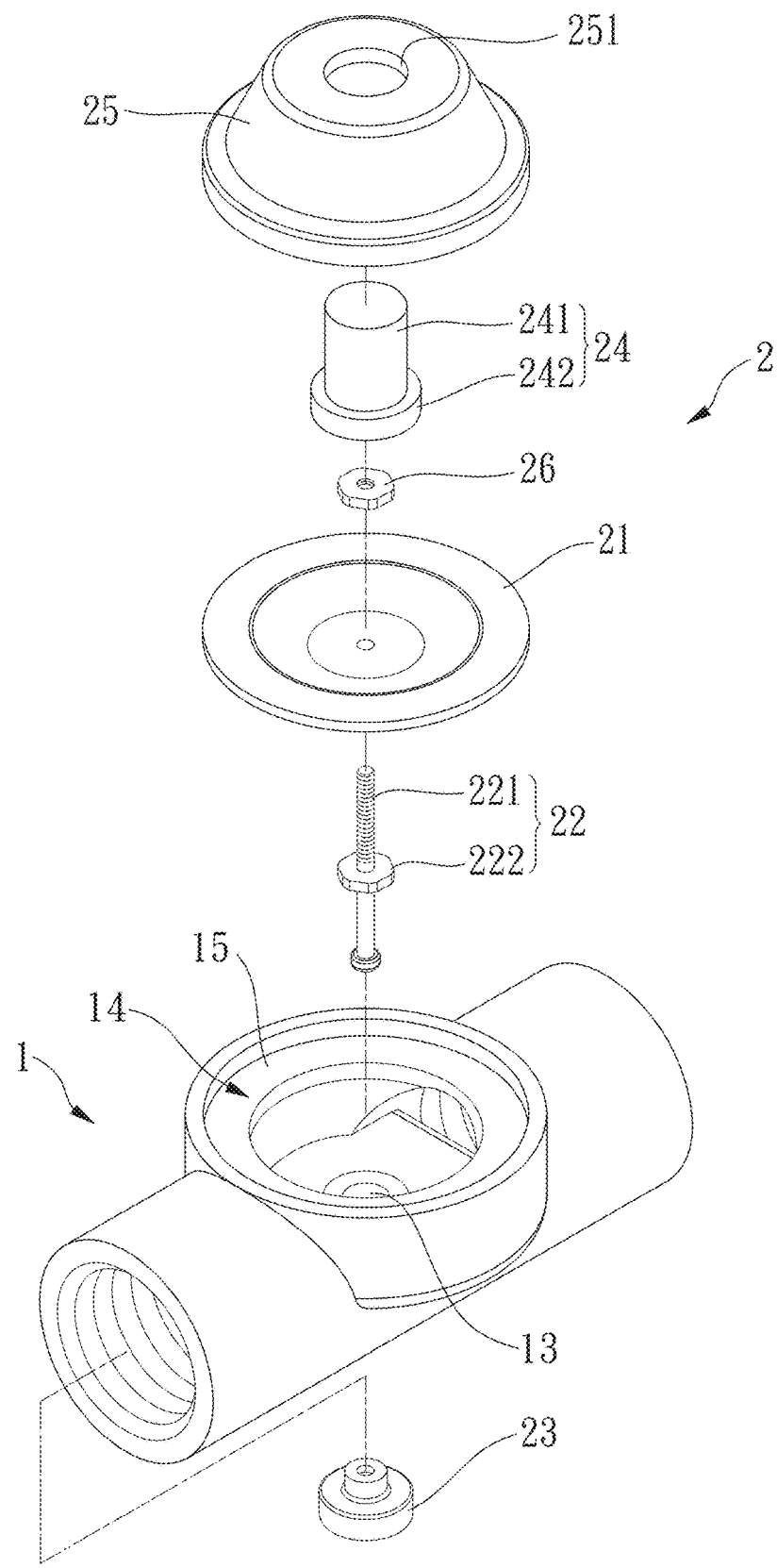
FIG. 2 is an exploded view of the present invention.
Figure 3:
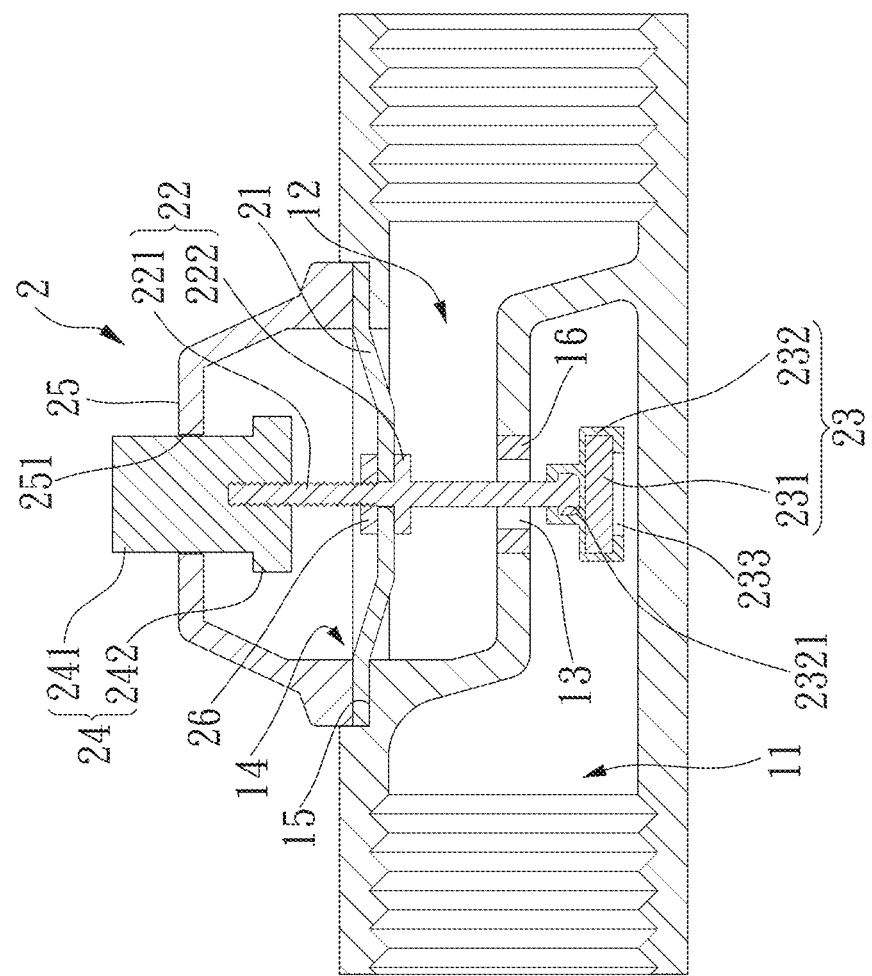
FIG. 3 is a cross sectional view, taken along line III-III of FIG. 1.

Referring to FIGS. 1 to 5, the overpressure shutdown device of the present invention comprises a main body (1) having an inlet chamber (11) and an outlet chamber (12) defined therein. A communication hole (13) is defined between the inlet chamber (11) and the outlet chamber (12). The main body (1) has a combined hole (14) which communicates with the outlet chamber (12). A circular groove (15) is recessed around the combined hole (14) on the outer side of the main body (1). A stop assembly (2) includes an elastic diaphragm (21), a rod (22), a valve member (23), a return button (24), and a cover (25). The cover (25) and the elastic diaphragm (21) are located in the circular groove (15). The elastic diaphragm (21) is partially located between the circular groove (15) and the cover (25). The cover (25) includes a cover opening (251). The return button (24) is at least partially located inside the cover (25) and corresponds to the cover opening (251). The valve member (23) is located at a position where the inlet chamber (11) is located corresponding to the communication hole (13). The rod (22) extends through the elastic diaphragm (21), and is connected between the return button (24) and the flow-stopping piece (23).

Figure 4:
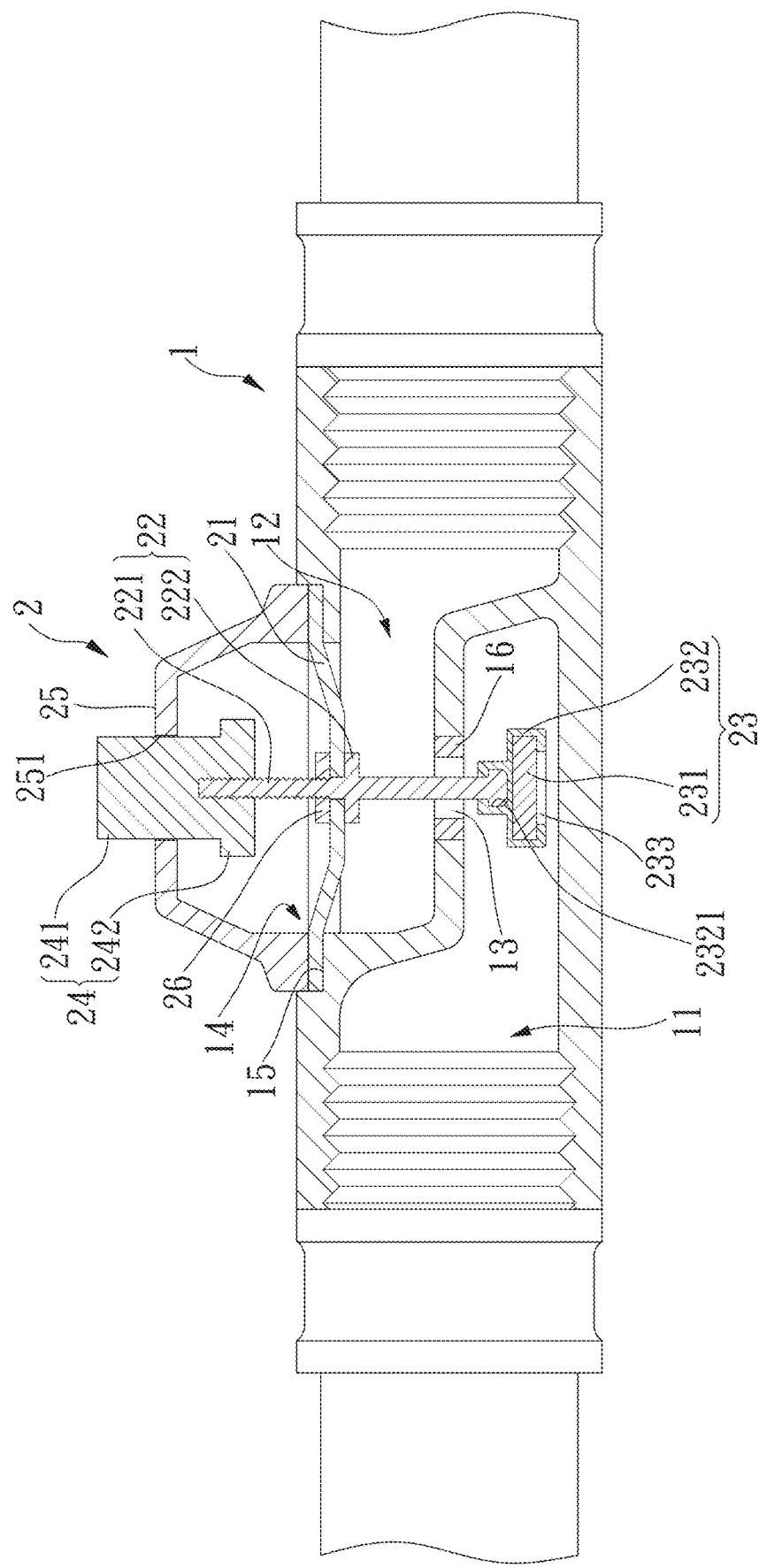
FIG. 4 is a schematic diagram of fluid circulation within the present invention.
Figure 5:
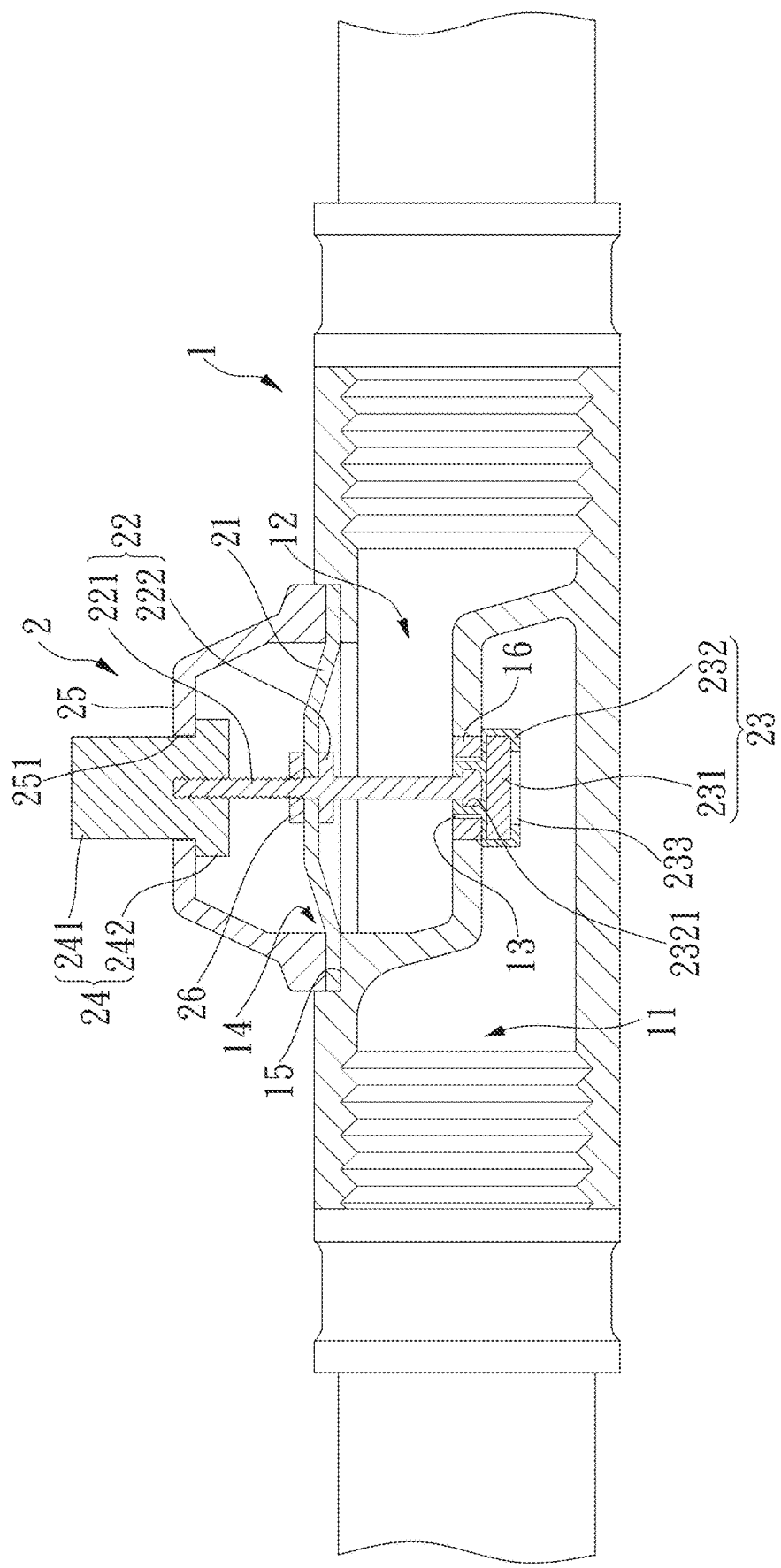
FIG. 5 illustrates the expansion of the elastic diaphragm, rising upward, and the valve member blocking the communication hole.

As shown in FIG. 4, the present invention achieves the effectiveness of stopping fluid overpressure by utilizing the combination of elastic diaphragm (21) with rod (22) and valve member (23). When fluid passing through inlet chamber (11) and outlet chamber (12) experiences a sudden increase in pressure due to unexpected occurrences (such as abnormalities in the gas supply source), causing instability and an increase in pressure inside the main body (1), the increased pressure, as shown in FIG. 5, causes the elastic diaphragm (21) to expand and rise upward. As the elastic diaphragm (21) rises, it drives the rod (22) upwards, ultimately blocking the communication hole (13) with the valve member (23), preventing fluid from flowing into the outlet chamber (12). When the anomaly is resolved, simply pressing down the return button (24) will cause the elastic diaphragm (21) to flip down and return to its initial state (as shown in FIG. 4), thereby releasing the fluid obstruction. It can be understood that the structure of the present invention achieves fluid obstruction and return functions with a single axial movement, without the need for multiple axial mechanisms as commonly seen in existing products to achieve various functions. Therefore, the complexity of the structure of the present invention is indeed lower compared to conventional products, which can lead to cost savings and reduced volume. The present invention is novel and progressive in this regard.

The rod (22) comprises a connected rod portion (221) and a ring piece portion (222). A clamp (26) is screwed onto the rod portion (221). The elastic diaphragm (21) is partially clamped between the ring piece portion (222) and the clamp (26).

The return button (24) comprises a connected narrow diameter segment (241) and a wide diameter segment (242). The narrow diameter segment (241) can pass through the cover opening (251), and the wide diameter segment (242) cannot pass through the cover opening (251). Therefore, it prevents the return button (24) from protruding completely out of the cover (25) when the return button (24) moves upward.

As shown in FIGS. 4 and 5, the narrow section (241) of the return button (24) can be longer and protrude from the cover (25). The advantage of this entire structure is that users can manually activate the fluid obstruction function by pulling the narrow section (24).

Furthermore, the valve member (23) comprises a metal layer (231) and an elastic coating layer (232). A part of the main body (1) around the communication hole (13) is a different material part (16), with at least one of the different material part (16) and the metal layer (231) being made of magnetic material and the other being made of ferromagnetic material. The magnetic material can be iron, cobalt, nickel, etc. The magnetic material may not necessarily possess magnetism, but when near a magnet, it becomes magnetized and exhibits magnetic properties. Therefore, with at least one of the different material part (16) and the metal layer (231) being a magnetic material, and the other being a ferromagnetic material, they can mutually attract when the valve member (23) abuts against the communication hole (13), thus achieving a more stable execution of fluid obstruction. In addition to the aforementioned structure, it can also be that at least one of the portions around the cover opening (251) of the cover (25) and the wide diameter segment (242) is a magnetic material, while the other is a ferromagnetic material.

Furthermore, the elastic coating layer (232) is combined with the rod (22) via a T-shaped groove (2321). Since the elastic coating layer (232) possesses elasticity, during assembly of the present invention, users only need to press one end of the rod (22) into the T-shaped groove (2321) to quickly complete the assembly.

In addition, there is a gap between one side of the elastic coating layer (232) away from the rod (22) and the metal layer (231), forming a circular recess (233).

Figure 6:
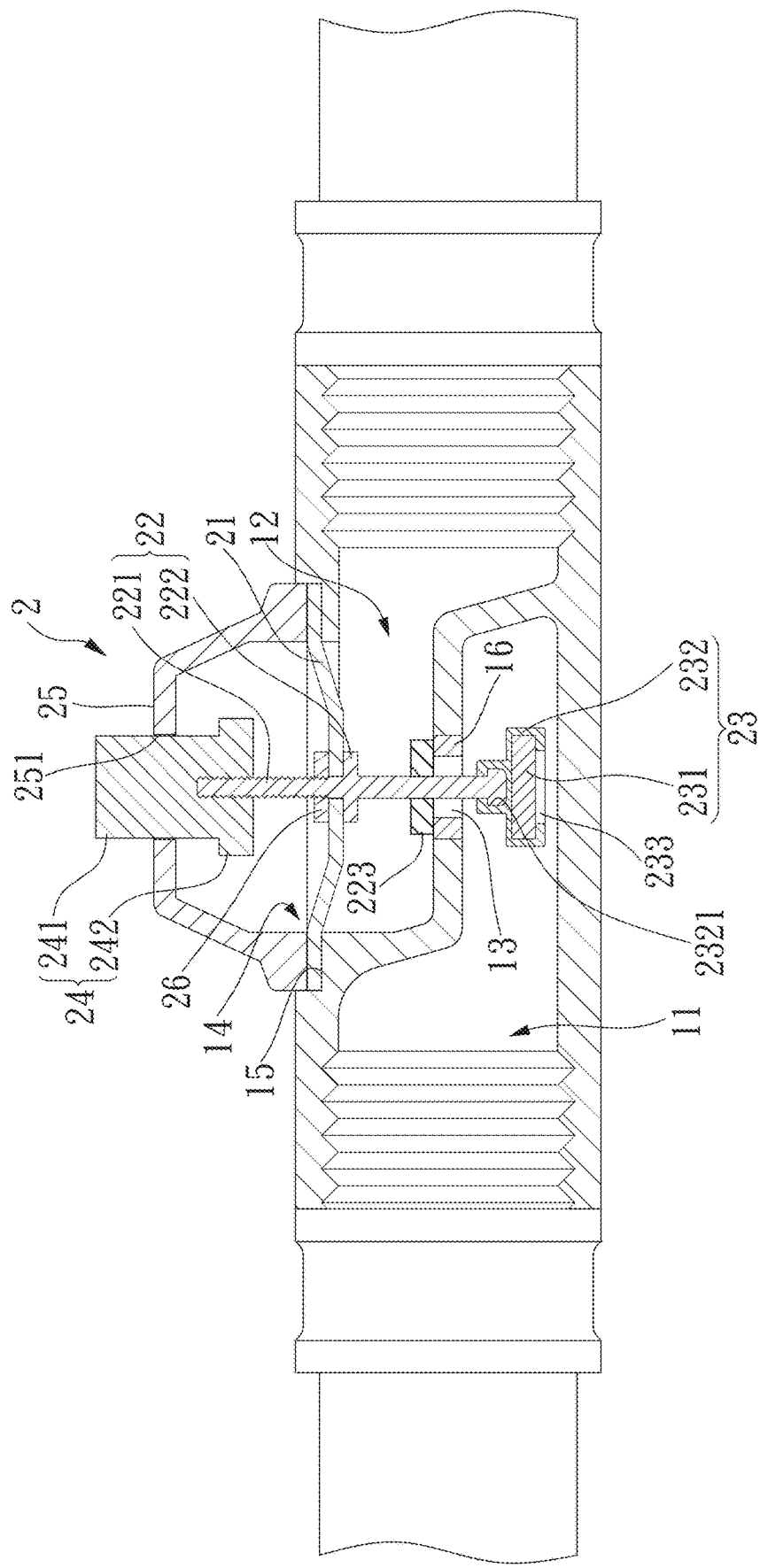
FIG. 6 show another embodiment of the present invention.
Figure 7:
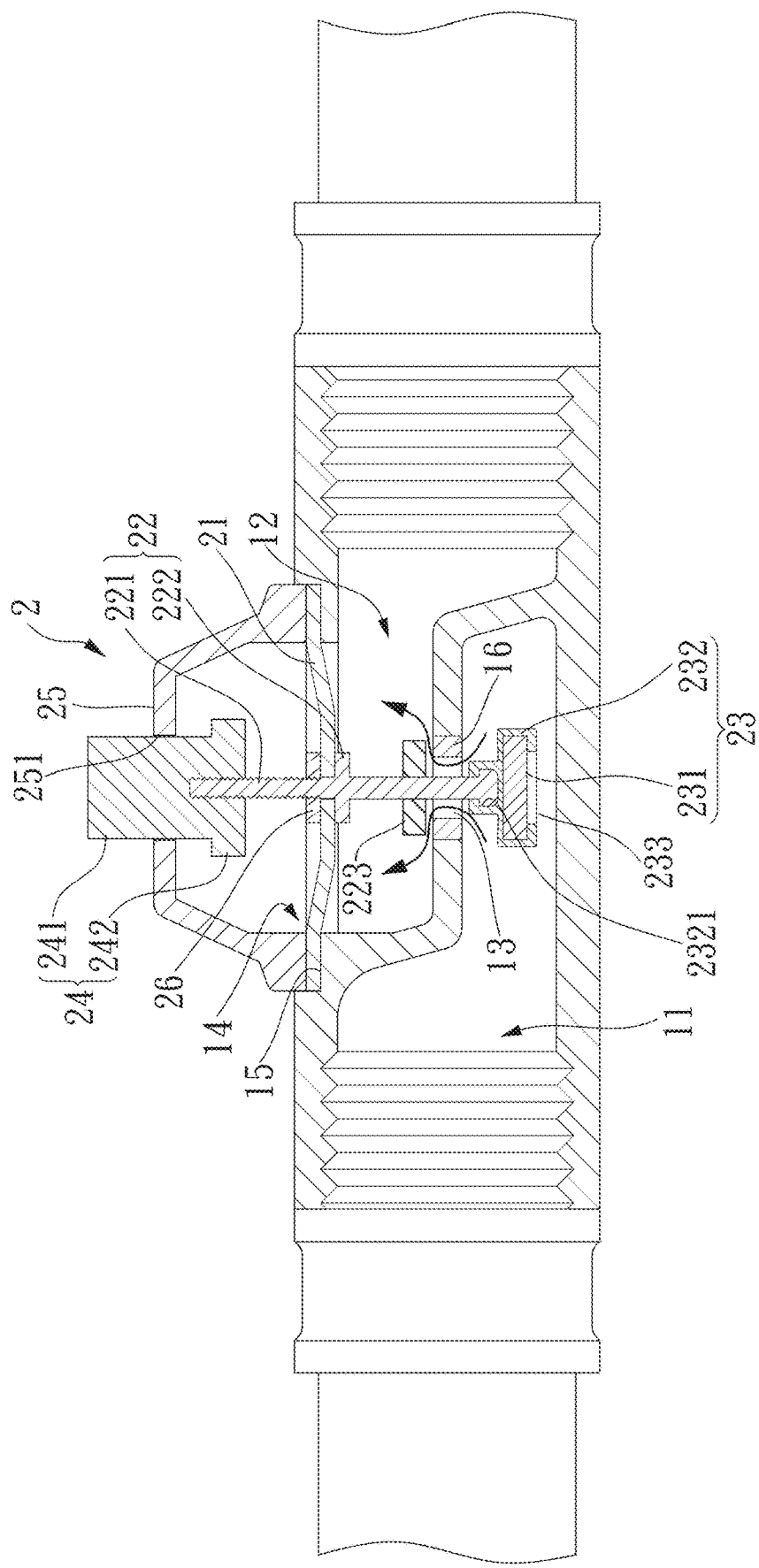
FIG. 7 is a schematic diagram showing fluid passage of another embodiment of the present invention.

As shown in FIG. 6, the rod (22) comprises a leakage prevention plate portion (223), which covers the communication hole (13) from above. When there is an abnormality in the gas source, component damage, improper human operation without complete closure, or installation and repair of end pipelines, it may cause a slight gas leakage from the gas source into the interior of the main body (1). However, the pressure caused by this type of gas microleakage is not sufficient to cause the elastic diaphragm (21) to expand and rise upward. The addition of the leakage prevention plate portion (223) prevents the leaked gas from pushing the leakage prevention plate portion (223) and avoids gas leakage. Additionally, when the gas equipment is used normally, the thrust generated by the flow velocity of the gas, as shown in FIG. 7, is sufficient to push the leakage prevention plate portion (223) slightly upward, allowing the rod (22) to rise slightly, ensuring smooth gas supply. Therefore, the structure of the leakage prevention plate portion (223) not only blocks abnormal gas leakage into the interior of the main body (1) but also does not affect the normal gas supply during regular use.

While we have shown and described the embodiment in accordance with the present invention, it should be clear to those skilled in the art that further embodiments may be made without departing from the scope of the present invention.

What is claimed is:

1. An overpressure shutdown device comprising:
a main body (1) having an inlet chamber (11) and an outlet chamber (12) defined therein, a communication hole (13) defined between the inlet chamber (11) and the outlet chamber (12), the main body (1) having a combined hole (14) which communicates with the outlet chamber (12), a circular groove (15) recessed around the combined hole (14) on the outer side of the main body (1), and
a stop assembly (2) including an elastic diaphragm (21), a rod (22), a valve member (23), a return button (24), and a cover (25), the cover (25) and the elastic diaphragm (21) located in the circular groove (15), the elastic diaphragm (21) partially located between the circular groove (15) and the cover (25), the cover (25) including a cover opening (251), the return button (24) at least partially located inside the cover (25) and corresponding to the cover opening (251), the valve member (23) located at a position where the inlet chamber (11) is located corresponding to the communication hole (13), the rod (22) extending through the elastic diaphragm (21), and the rod (22) connected between the return button (24) and the valve member (23), the rod (22) comprising a connected rod portion (221) and a ring piece portion (222), and a clamp (26)

screwed onto the rod portion (221), with the elastic diaphragm (21) partially clamped between the ring piece portion (222) and the clamp (26).

2. The overpressure shutdown device as claimed in claim 1, wherein the return button (24) comprises a connected narrow diameter segment (241) and a wide diameter segment (242), the narrow diameter segment (241) can pass through the cover opening (251), and the wide diameter segment (242) cannot pass through the cover opening (251).

3. The overpressure shutdown device as claimed in claim 1, wherein the rod (22) comprises a leakage prevention plate portion (223), which covers the communication hole (13) from above.

4. The overpressure shutdown device as claimed in claim 1, wherein the valve member (23) comprises a metal layer (231) and an elastic coating layer (232), and a part of the main body (1) around the communication hole (13) is a different material part (16), with at least one of the different material part (16) and the metal layer (231) being made of magnetic material and the other being made of ferromagnetic material.

5. The overpressure shutdown device as claimed in claim 4, wherein the elastic coating layer (232) is combined with the rod (22) via a T-shaped groove (2321).

6. The overpressure shutdown device as claimed in claim 4, wherein there is a gap between one side of the elastic coating layer (232) away from the rod (22) and the metal layer (231), forming a circular recess (233).

\* \* \* \* \*